US010973178B2

(12) United States Patent
Millar et al.

(10) Patent No.: US 10,973,178 B2
(45) Date of Patent: Apr. 13, 2021

(54) SYSTEMS AND METHODS FOR MANAGING WATER DOSAGES IN AN ASSEMBLY LINE GROW POD

(71) Applicant: Grow Solutions Tech LLC, Lehi, UT (US)

(72) Inventors: Gary Bret Millar, Highland, UT (US); Mark Gerald Stott, Eagle Mountain, UT (US); Todd Garrett Tueller, American Fork, UT (US)

(73) Assignee: Grow Solutions Tech LLC, Vineyard, UT (US)

( * ) Notice: Subject to any disclaimer, the term of this patent is extended or adjusted under 35 U.S.C. 154(b) by 408 days.

(21) Appl. No.: 15/985,239

(22) Filed: May 21, 2018

(65) Prior Publication Data
US 2018/0359953 A1 Dec. 20, 2018

Related U.S. Application Data

(60) Provisional application No. 62/519,639, filed on Jun. 14, 2017.

(51) Int. Cl.
*A01G 9/24* (2006.01)
*A01G 27/00* (2006.01)
(Continued)

(52) U.S. Cl.
CPC ............ *A01G 9/247* (2013.01); *A01D 91/00* (2013.01); *A01G 27/003* (2013.01); *A01G 31/042* (2013.01); *A01G 31/06* (2013.01)

(58) Field of Classification Search
CPC ...... A01G 9/247; A01G 31/042; A01G 31/06; A01G 27/003
See application file for complete search history.

(56) References Cited

U.S. PATENT DOCUMENTS 7,494,070 B2   2/2009   Collins
9,629,313 B1   4/2017   Grossman
(Continued)

FOREIGN PATENT DOCUMENTS

GB      2121263 A     12/1983
WO   2008111830 A1    9/2008
(Continued)

OTHER PUBLICATIONS

Moroccan Examination Report cited in Moroccan Application No. 44945 dated Jun. 10, 2019.
(Continued)

*Primary Examiner* — Magdalena Topolski
*Assistant Examiner* — Katelyn T Truong
(74) *Attorney, Agent, or Firm* — Dinsmore & Shohl LLP

(57) ABSTRACT

Assembly line grow pods that include watering stations positioned to provide water plant material at predetermined days of growth and methods of supplying the same are disclosed. An assembly line grow pod includes a track extending a length between a seeder component and a harvester component, a plurality of watering stations arranged adjacent to the track at a plurality of locations along the length of the track between seeder and harvester components, and a cart supported on and movable along the track from the seeder component to the harvester component such that seeds that are placed by the seeder component within the cart grow into plant material that is harvested at the harvester component. Each one of the plurality of watering stations is positioned between the seeder and harvester components such that water is provided by the watering station to the cart at a predetermined growth metric.

20 Claims, 5 Drawing Sheets

(51) Int. Cl.
*A01D 91/00* (2006.01)
*A01G 31/04* (2006.01)
*A01G 31/06* (2006.01)

(56) References Cited

U.S. PATENT DOCUMENTS

| | | | |
|---|---|---|---|
| 10,094,116 B2* | 10/2018 | Mawendra | A01G 31/042 |
| 2005/0217172 A1 | 10/2005 | Korte et al. | |
| 2012/0137578 A1* | 6/2012 | Bradford | A01G 31/06 47/65 |
| 2013/0104453 A1* | 5/2013 | Hassle | A01C 1/02 47/17 |
| 2014/0259920 A1 | 9/2014 | Wilson | |
| 2015/0100168 A1 | 4/2015 | Oliver et al. | |
| 2015/0264859 A1* | 9/2015 | Morrissey | A01G 27/003 700/282 |
| 2016/0219794 A1* | 8/2016 | Greenberg | H05B 45/20 |
| 2017/0291616 A1 | 10/2017 | Carpenter et al. | |
| 2018/0007845 A1* | 1/2018 | Martin | A01G 9/246 |
| 2019/0082620 A1* | 3/2019 | Griffin | A01G 9/26 |

FOREIGN PATENT DOCUMENTS

| | | |
|---|---|---|
| WO | 2013066254 A1 | 5/2013 |
| WO | 2014066844 A2 | 5/2014 |
| WO | 2016138075 A1 | 9/2016 |
| WO | 2017024353 A1 | 2/2017 |

OTHER PUBLICATIONS

International Search Report and Written Opinion relating to International Application No. PCT/US2018/034056 dated Sep. 25, 2018.

* cited by examiner

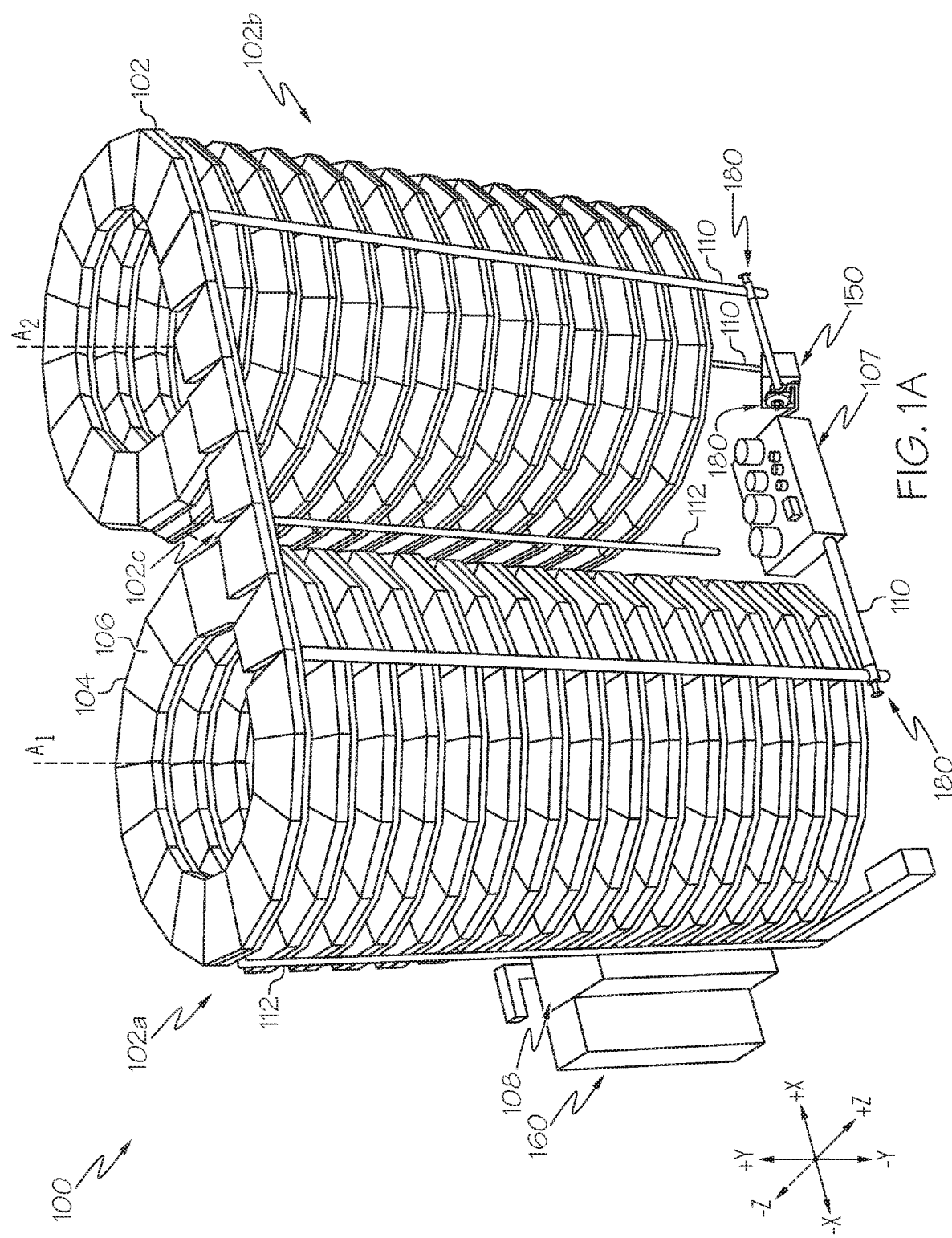

SYSTEMS AND METHODS FOR MANAGING WATER DOSAGES IN AN ASSEMBLY LINE GROW POD

CROSS REFERENCE TO RELATED APPLICATION

This application claims the benefit of U.S. Provisional Application Ser. No. 62/519,639, filed on Jun. 14, 2017, which is incorporated by reference in its entirety.

TECHNICAL FIELD

Embodiments described herein generally relate to systems and methods for managing water dosages to plant material in an assembly line grow pod and, more specifically, to determining a location of a cart holding plant material within an assembly line grow pod and determining the amount of water to be distributed based on the location of the cart and various characteristics of the plant material.

BACKGROUND

Industrial grow pods that are used to continuously grow crops may utilize an assembly line of carts that continuously traverse a track as plant seeds are planted, grown, and harvested, and then continue to traverse the track as the carts (and/or trays thereon) are cleaned and washed to repeat the process. To ensure smooth operation of the industrial grow pod, it may be necessary to ensure that precise amounts of water are supplied to plant matter, such as plants, shoots, and seeds within the grow pod at a particular time to ensure optimum growth, to avoid excess fluid (e.g., runoff), and/or the like. Current solutions may provide water distribution, but often fail to provide specific and customized water and distribution to the plant matter at particular times based on recipes, measured water consumption, and/or anticipated water consumption.

SUMMARY

Assembly line grow pods and methods of supplying water to plant material at a predetermined day of growth are disclosed herein. One embodiment includes an assembly line grow pod which includes a track extending a length between a seeder component and a harvester component, a plurality of watering stations arranged adjacent to the track at a plurality of locations along the length of the track between the seeder component and the harvester component, and a cart supported on the track and movable along the track from the seeder component to the harvester component such that seeds that are placed by the seeder component within the cart grow into plant material that is harvested at the harvester component. Each one of the plurality of watering stations is positioned between the seeder component and the harvester component such that water is provided by the watering station to the cart at a predetermined growth metric.

In another embodiment, an assembly line grow pod includes a track extending a length, a plurality of watering stations positioned adjacent to the track at a plurality of locations along the length of the track, a cart supported on the track, the cart holding plant material therein, and a master controller including a processor and a non-transitory storage medium. The non-transitory storage medium has one or more programming instructions stored thereon that, when executed, cause the processor to determine a location of the cart relative to one or more of the plurality of watering stations, determine one or more characteristics of the plant material held within the cart, determine an amount of water to be supplied to the cart based on the location of the cart and the one or more characteristics of the plant material, determine one or more of the plurality of watering stations to supply the water to the cart, and transmit a signal to the one or more of the plurality of watering stations, wherein the signal causes the one or more of the plurality of watering stations to supply the amount of water to the cart when the cart is adjacent to each of the one or more of the plurality of watering stations.

In yet another embodiment, a method of supplying a predetermined amount of water to plant material within a tray on a cart supported on a track in an assembly line grow pod includes determining, by a processor, a location of the cart relative to one or more of a plurality of watering stations adjacent to the track within the assembly line grow pod, determining, by the processor, one or more characteristics of the plant material within the tray, determining, by the processor, an amount of water to be supplied to the tray based on the location of the cart and the one or more characteristics of the plant material, determining, by the processor, one or more of the plurality of watering stations to supply the water to the tray, and transmitting, by the processor, a signal to the one or more of the plurality of watering stations, wherein the signal causes the one or more of the plurality of watering stations to supply the amount of water to the tray when the cart is adjacent to each of the one or more of the plurality of watering stations.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 1A schematically depicts a front perspective view of an illustrative assembly line grow pod according to one or more embodiments shown and described herein;

DETAILED DESCRIPTION

Embodiments disclosed herein include devices, systems, and methods for distributing a particular amount of water to each cell of a plurality of cells of a tray on a cart supported on a track in an assembly line grow pod when the cart is located in a particular location within the assembly line grow pod and when the plant material within each cell is at a particular simulated day of growth. The assembly line grow pod may include a plurality of carts that follow the track. The devices, systems, and methods may be embodied as a plurality of water lines and water distribution manifolds that are controlled by a master controller, which, in addition to one or more other components in the assembly line grow pod, directs water to a particular cart at a particular period in time to ensure optimum growth of the plant matter as the carts traverse the track.

As used herein, the term "plant matter" may encompass any type of plant and/or seed material at any stage of growth, for example and without limitation, seeds, germinating seeds, vegetative plants, and plants at a reproductive stage.

As used herein, a "growth metric" generally refers to a means of measuring plant growth over a particular period of time. For example, plant growth can be measured in length, width, surface area and/or the like (e.g., an amount of stem growth, an amount of leaf growth). In another example, plant growth can be measured numerically by counting a number, an average number, or an estimated number of harvestable components produced by the plant (e.g., a number of fruits produced, a number of seeds produced, a number of flowers produced). In yet another example, plant growth can be measured based on weight or mass of the plant, where a particular increase in weight or mass is indicative of a particular amount of growth. The particular period of time is not limited by this disclosure, and may be, for example, an hour, a plurality of hours, a day, a plurality of days, a week, two weeks, a month, or the like. The period of time may be a simulated period of time (e.g., a simulated "day" may be from "sunup" (when lights are activated) to "sundown" (when lights are extinguished), regardless of whether this simulated day corresponds to an actual day outside the assembly line grow pod. As such, a growth metric may be, for example, an increase in mass over one simulated day.

Figure 1B:
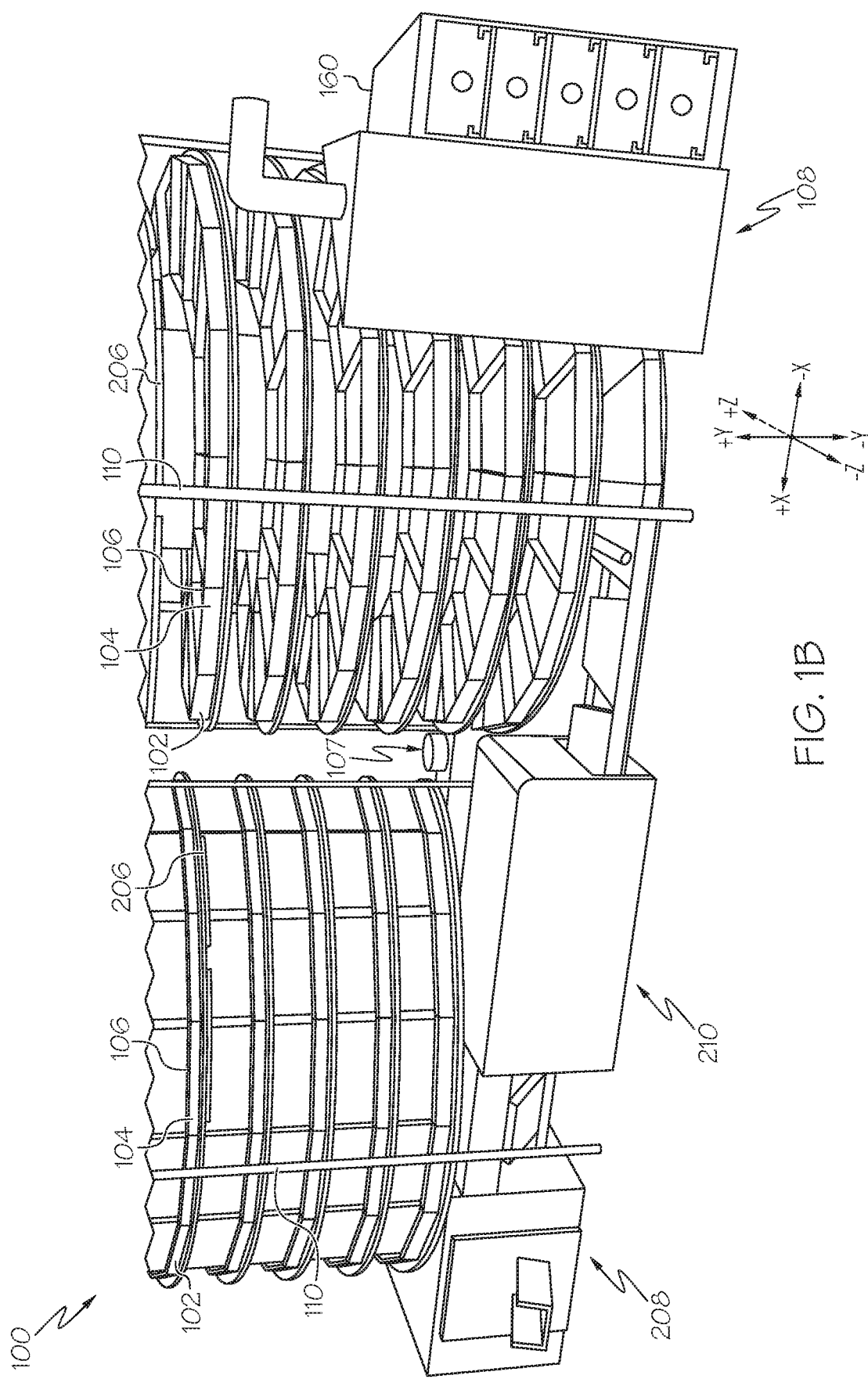
FIG. 1B schematically depicts a rear perspective view of a portion of an illustrative assembly line grow pod according to one or more embodiments shown and described herein.

An illustrative industrial grow pod that allows for the continuous, uninterrupted growing of crops is depicted herein. Particularly, FIG. 1A depicts a front perspective view of an illustrative assembly line grow pod 100 according to one or more embodiments shown and described herein. In addition, FIG. 1B depicts a rear perspective view of a portion of the assembly line grow pod 100. As illustrated in FIGS. 1A and 1B, the assembly line grow pod 100 may include a track 102 that holds one or more carts 104. Referring particularly to FIG. 1A, the track 102 may include at least an ascending portion 102a, a descending portion 102b, and a connection portion 102c. The track 102 may wrap around (e.g., in a counterclockwise direction, as shown in FIG. 1A) a first axis $A_1$ such that the carts 104 ascend upward in a vertical direction (e.g., in the +y direction of the coordinate axes of FIG. 1A). The connection portion 102c may be relatively level (although this is not a requirement) and is utilized to transfer carts 104 to the descending portion 102b. The descending portion 102b may be wrapped around a second axis $A_2$ (e.g., in a counterclockwise direction, as shown in FIG. 1A) that is substantially parallel to the first axis $A_1$, such that the carts 104 may be returned closer to a ground level. As such, the track 102 may generally extend between portions of the assembly line grow pod 100, such as between a seeder component 108 and a harvester component 208, as described in greater detail herein.

The ascending portion 102a and the descending portion 102b may allow the track 102 to extend a relatively long distance while occupying a comparatively small footprint evaluated in the x-direction and the z-direction as depicted in the coordinate axes of FIG. 1A, as compared to assembly line grow pods that do not include an ascending portion 102a and a descending portion 102b. Minimizing the footprint of the assembly line grow pod 100 may be advantageous in certain applications, such as when the assembly line grow pod 100 is positioned in a crowded urban center or in other locations in which space may be limited.

It should be understood that while the embodiment of FIGS. 1A and 1B depict an assembly line grow pod 100 that wraps around a plurality of axes $A_1$, $A_2$, this is merely one example. Any configuration of assembly line or stationary grow pod may be utilized for performing the functionality described herein.

Referring to FIG. 1A, supported on each one of the carts 104 is a tray 106. The tray 106 may generally contain one or more components for holding plant matter. That is, the tray 106 may be configured to hold seeds as the seeds germinate and grow into shoots and plants as the cart 104 traverses the ascending portion 102a, the descending portion 102b, and the connection portion 102c of the track 102 of the assembly line grow pod 100. The seeds may be planted, allowed to grow, and then may be harvested by various components of the assembly line grow pod 100, as described in greater detail herein. In some instances, the plant matter within the carts 104 may not be ready for harvest after moving down the descending portion 102b. In these instances, the carts 104 may proceed to take another lap up the track 102 of the ascending portion 102a, across the connection portion 102c, and down the track 102 of the descending portion 102b. In addition, the seeds (and thereafter the shoots, plants, and/or other plant matter) within the trays 106 may be monitored, provided with water, nutrients, environmental conditions, light, and/or the like to facilitate growing, as also described in greater detail herein.

Also depicted in FIGS. 1A and 1B is a master controller 160. The master controller 160 may include, among other things, control hardware for controlling various components of the assembly line grow pod 100, as described in greater detail herein. In some embodiments, the master controller 160 may be arranged as a modular control interface that receives a plurality of hot-swappable control modules, as described in greater detail herein. In some embodiments, the master controller 160 may be particularly configured to control operation of a water distribution manifold, pumps, valves, and/or the like to deliver a particular amount of water to a particular cart at a particular location within the assembly line grow pod 100, as described in greater detail herein.

The assembly line grow pod 100 may include a seeder component 108 in various embodiments. The seeder component 108 may be configured to place seeds in the trays 106 supported on the one or more carts 104 as the carts 104 pass the seeder component 108 in the assembly line. Depending on the particular embodiment, each cart 104 may include a single section tray 106 for receiving a plurality of seeds. Some embodiments may include a multiple section tray 106 for receiving individual seeds in each section (or cell). In the embodiments with a single section tray 106, the seeder component 108 may detect the presence of the respective cart 104 and may begin laying seed across an area of the single section tray 106. The seed may be laid out according to a desired depth of seeds, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged. Such a pre-treatment of seeds may be completed by a fluid distribution manifold, as described in greater detail herein.

In the embodiments where a multiple section tray 106 is utilized with one or more of the carts 104, the seeder component 108 may be configured to individually insert seeds into one or more of the sections of the tray 106. Again, the seeds may be distributed on the tray 106 (or into individual cells) according to a desired number of seeds, a desired area the seeds should cover, a desired depth of seeds, etc.

Referring to FIG. 1A, the assembly line grow pod 100 may also include a watering component 107 coupled to one or more water lines 110 (e.g., fluid lines) via one or more pumps 150 and/or one or more flow control valves 180 in some embodiments. While only a single pump 150 is depicted in FIG. 1A, it should be understood that the assembly line grow pod 100 may incorporate a plurality of pumps 150 in some embodiments. Likewise, while a plurality of flow control valves 180 are depicted in FIG. 1A, it should be understood that the assembly line grow pod 100 may incorporate a single flow control valve 180 in some embodiments. The watering component 107, the one or more pumps 150, the one or more flow control valves 180, and the one or more water lines 110 may distribute water and/or nutrients to one or more water distribution manifolds (not shown) located at various locations within the assembly line grow pod 100, which then distribute a precise amount of water and/or nutrients to trays 106, as described in greater detail herein. In some embodiments, the master controller 160 may be communicatively coupled to the watering component 107, the one or more pumps 150, and the one or more flow control valves 180 such that the master controller 160 transmits signals for the operation of the watering component 107, the one or more pumps 150, and the one or more flow control valves 180 to selectively control flow and/or pressure of fluid accordingly, as described herein.

For example, the one or more water lines 110 may extend between the watering component 107 and one or more watering stations having one or more water distribution manifolds and arranged at particular locations within the assembly line grow pod 100 such that the pumps 150 connected in line with the water lines 110 pump water and/or nutrients to the one or more watering stations and into the one or more water distribution manifolds and the one or more flow control valves 180 direct flow of the water and/or nutrients to the water distribution manifolds within each of the one or more watering stations. As a cart 104 passes a watering station, a particular amount of water may be provided to the tray 106 supported by the cart 104 and/or individual cells within the tray 106 by the water distribution manifold, as described in greater detail herein. For example, seeds may be watered by the water distribution manifold to reduce buoyancy and then flooded. Additionally, water usage and consumption may be monitored at a watering station and data may be generated that corresponds to such water usage and consumption. As such, when the cart 104 reaches a subsequent watering station along the track 102 in the assembly line grow pod 100, the data may be utilized to determine an amount of water to be supplied to the tray 106 via the fluid distribution manifold at that time. Additional details regarding this watering and data collection are described in greater detail hereinbelow.

In addition, the watering component 107 is communicatively coupled to the master controller 160 such that the master controller 160 provides control signals to the watering component 107 and/or receives status signals from the watering component 107. As a result of this providing and receiving of signals, the master controller 160 can effectively direct the watering component 107 to provide fluid to the one or more water distribution manifolds via one or more water lines 110 fluidly coupled to the watering component 107.

Also depicted in FIG. 1A are airflow lines 112, which may also be fluidly connected to one or more air pumps and/or one or more air valves (not shown in FIG. 1A). Specifically, the one or more air pumps may be pumps that are similar to pumps 150, but are coupled to the airflow lines 112 to deliver air to one or more portions of the assembly line grow pod 100. In addition, the one or more air valves may be valves that are similar to the flow control valves 180, but are coupled to the airflow lines 112 to direct airflow to one or more portions of the assembly line grow pod 100. The air may be delivered, for example, to control a temperature of the assembly line grow pod 100 or an area thereof, control a pressure of the air in the assembly line grow pod 100 or an area thereof, control a concentration of carbon dioxide ($CO_2$) in the air of the assembly line grow pod 100 or an area thereof, control a concentration of oxygen ($O_2$) in the air of the assembly line grow pod 100 or an area thereof, control a concentration of nitrogen in the air of the assembly line grow pod 100 or an area thereof and/or the like.

Accordingly, the airflow lines 112 may distribute the airflow at particular areas in the assembly line grow pod 100 to facilitate control. As such, the airflow lines 112 may be fluidly coupled to a pump and/or a valve and may further be fluidly coupled between an air source and a target air delivery area. In addition, sensors may sense characteristics (e.g., a concentration, a pressure, a temperature, flow velocity, and/or the like) and may generate data and/or signals corresponding to the sensed characteristics, which may be used for further control.

Referring to FIG. 1B, additional components of the assembly line grow pod 100 are illustrated, including (but not limited to) one or more lighting devices 206, a harvester component 208, and a sanitizer component 210. As described above, the seeder component 108 may be configured to seed the trays 106 of the carts 104. Also referring to FIG. 1A, the lighting devices 206 may provide light waves that may facilitate plant growth at various locations throughout the assembly line grow pod 100 as the carts 104 traverse the track 102. Depending on the particular embodiment, the lighting devices 206 may be stationary and/or movable. As an example, some embodiments may alter the position of the lighting devices 206, based on the plant type, stage of development, recipe, and/or other factors.

Additionally, as the plants are provided with light, watered, and provided nutrients, the carts 104 traverse the track 102 of the assembly line grow pod 100. Additionally, the assembly line grow pod 100 may detect a growth and/or fruit output of a plant and may determine when harvesting is warranted. If harvesting is warranted prior to the cart 104 reaching the harvester component 208, modifications to a recipe may be made for that particular cart 104 until the cart 104 reaches the harvester component 208. Conversely, if a cart 104 reaches the harvester component 208 and it has been determined that the plants in the cart 104 are not ready for harvesting, the assembly line grow pod 100 may commission the cart 104 for another lap. This additional lap may include a different dosing of light, water, nutrients, etc. and the speed of the cart 104 could change, based on the development of the plants on the cart 104. If it is determined that the plants on a cart 104 are ready for harvesting, the harvester component 208 may harvest the plants from the trays 106.

Still referring to FIG. 1B, the harvester component 208 may cut the plants at a particular height for harvesting in some embodiments. In some embodiments, the tray 106 may be overturned to remove the plants from the tray 106 and into a processing container for chopping, mashing, juicing, and/or the like. Because many embodiments of the assembly line grow pod 100 do not use soil, minimal (or no) washing of the plants may be necessary prior to processing.

Similarly, some embodiments may be configured to automatically separate fruit from the plant, such as via shaking, combing, etc. If the remaining plant material may be reused to grow additional fruit, the cart 104 may keep the remaining plant and return to the growing portion of the assembly line. If the plant material is not to be reused to grow additional fruit, it may be discarded or processed, as appropriate.

Once the cart 104 and tray 106 are clear of plant material, the sanitizer component 210 may remove any particulate matter, plant material, and/or the like that may remain on the cart 104. As such, the sanitizer component 210 may implement any of a plurality of different washing mechanisms, such as high pressure water, high temperature water, and/or other solutions for cleaning the cart 104 and/or the tray 106. As such, the sanitizer component 210 may be fluidly coupled to one or more of the water lines 110 to receive water that is pumped via the one or more pumps 150 and directed via the one or more flow control valves 180 (FIG. 1A) through the water lines 110.

Still referring to FIG. 1B, the tray 106 may be overturned to output the plant for processing and the tray 106 may remain in this position in some embodiments. As such, the sanitizer component 210 may receive the tray 106 in this position, which may wash the cart 104 and/or the tray 106 and return the tray 106 back to the growing position. Once the cart 104 and/or tray 106 are cleaned, the tray 106 may again pass the seeder component 108, which may determine that the tray 106 requires seeding and may begin the process placing seeds in the tray 106, as described herein.

It should be understood that the assembly line grow pod 100 may include additional components not specifically described herein, and the present disclosure is not limited solely to the components described herein. Illustrative additional components may include, but are not limited to, other watering components, other lighting components, other airflow components, growth monitoring components, other harvesting components, other washing and/or sanitizing components, and/or the like.

Figure 2:
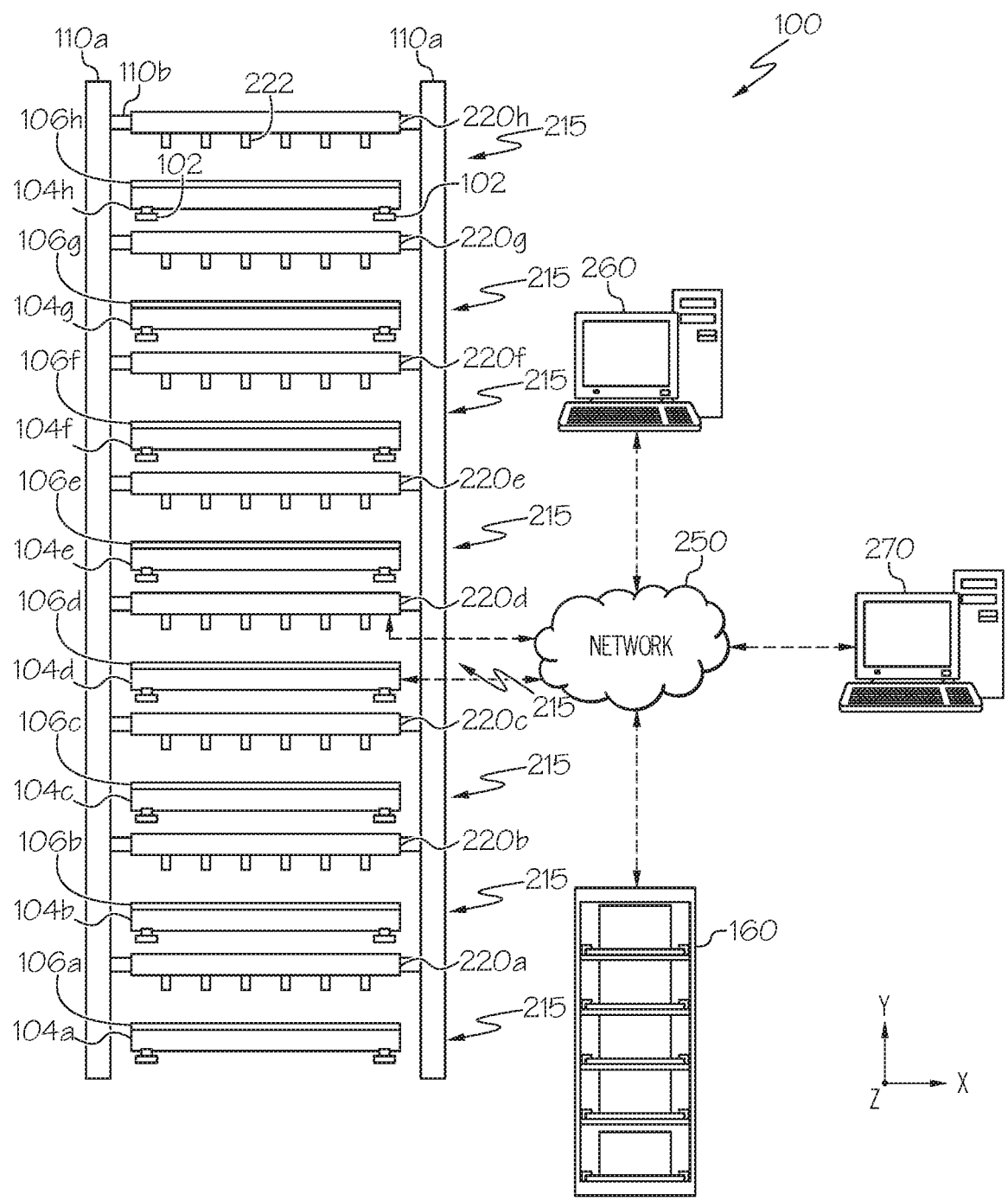
FIG. 2 schematically depicts a cross sectional side view of an illustrative track supporting a plurality of carts adjacent to watering stations in communication with a master controller and external computing devices via a network according to one or more embodiments shown and described herein.

Referring now to FIG. 2, the arrangement of a plurality of watering stations 220a-220h (collectively 220) relative to the plurality of trays 106a-106h (collectively 106), each of which is held by a cart 104a-104h (collectively 104) and supported on the track 102 when the carts 104 are positioned adjacent to the watering stations 220 is shown. More specifically, FIG. 2 depicts a cross sectional view of the assembly line grow pod 100 to illustrate the arrangement according to embodiments described herein. Due to the curved arrangement of the track 102 around an axis as described herein with respect to FIG. 1A, the track 102 spirals in a vertical direction (e.g., along the y axis of the coordinate axes of FIG. 2) such that the assembly line grow pod 100 provides the perception of a plurality of floors 215, as shown in FIG. 2. It should be understood that the spiraling arrangement of the track 102 results in no actual floors, as the track 102 is a singular track. However, when viewed from the angle depicted in FIG. 2, the perception of a plurality of floors is apparent. As such, the use of "floor" as described herein refers to the perception of floors rather than the actual number of floors. Each perceived floor 215 is denoted by the next level of the track 102 when it ascends in the ascending portion 102a (FIG. 1A) or descends in the descending portion 102b (FIG. 1A). Still referring to FIG. 2, eight perceived floors 215 are depicted. However, the present disclosure is not limited to such, and fewer or greater floors 215 may be created by the track 102.

The plurality of carts 104 may be positioned throughout the assembly line grow pod 100 as they traverse the track. For example, at least one of the carts 104a-104h may be positioned at each floor 215 of the assembly line grow pod 100. However, it should be understood that this is merely illustrative, and not each floor 215 may contain one of the carts 104a-104h at a particular period in time. For the purposes of explaining FIG. 2, each of the carts 104a-104h may be at a corresponding one of the floors 215 at the same time, and may traverse the track 102 such that all of the carts 104a-104h move up (or down) a floor 215 after a particular period of time has elapsed. For example, a first cart 104a will be at the position of a second cart 104b after a certain period of time (e.g., 2 hours, 4 hours, 6 hours, 12 hours, 24 hours, or the like). Correspondingly, the second cart 104b will be at the position of a third cart 104c after this certain period of time.

In some embodiments, the water lines 110 previously described herein may include a plurality of vertical water lines 110a and/or a plurality of horizontal water lines 110b. That is, each of the plurality of vertical water lines 110a may extend in a generally vertical direction (e.g., along they axis of the coordinate axes of FIG. 2). In addition, each of the plurality of horizontal water lines 110b may extend in a generally horizontal direction (e.g., along the x axis of the coordinate axes of FIG. 2).

Referring also to FIGS. 1A and 1B, each of the plurality of vertical water lines 110a may be fluidly coupled to a water supply, such as, for example, the watering component 107. In addition, each of the plurality of vertical water lines 110a may also be fluidly coupled to one or more of the plurality of horizontal water lines 110b. To ensure flow of fluid through the plurality of vertical water lines 110a and/or to ensure flow of fluid from the watering component 107, one or more of the pumps 150 and/or flow control valves 180 may be fluidly coupled to the vertical water lines 110a, For example, water may be supplied from the watering component to the vertical water lines 110a and/or the horizontal water lines 110b via the one or more pumps 150 and/or the one or more flow control valves 180, which control the movement and flow of fluid from the watering component 107 to the vertical water lines 110a and/or the horizontal water lines 110b by pumping water, directing the flow of water, and/or the like.

Each of the vertical water lines 110a and/or the horizontal water lines 110b may be fluidly coupled to each of the watering stations 220a-220h (only the horizontal water lines 110b are shown in FIG. 2). As such, water that flows from the vertical water lines 110a and/or the horizontal water lines 110b is supplied to the watering stations 220a-220h such that water can be subsequently supplied to the respective trays 106a-106h adjacent thereto via one or more water outlets 222. Other than having the water outlets 222, the watering stations 220a-220h are not limited by the present disclosure. As such, the watering stations 220a-220h may contain one or more components for supplying water to each of the trays 106a-106h when located adjacent thereto. In some embodiments, the watering stations 220a-220h may have various components that provide a measured and particular amount of water to each tray 106 or a portion of each tray 106. For example, the watering stations 220a-220h may include one or more watering manifolds that are particularly configured to supply a precise amount of water based on the pressure of the water entering the watering manifold and the tension of a biasing assembly within a pressure relief valve fluidly coupled to one of the one or more water outlets 222. In another example, the watering stations 220a-220h may include one or more peristaltic pumps fluidly coupled to each of the one or more water outlets 222, the peristaltic pumps configured to provide a precise amount of water to each tray 106 or a portion thereof. While FIG. 2 depicts each of the watering stations 220a-220h having six water outlets 222, more than or less than six water outlets 222 may be included at each of the watering stations 220a-220h without departing from the scope of the present disclosure. In some embodiments, the number of water outlets 222 may correspond to a number of cells extending across a length of a tray 106 in each cart 104 such that each of the cells is watered by a corresponding water outlet 222.

While FIG. 2 depicts the watering stations 220a-220h as generally being in the same location on each floor 215 of the assembly line grow pod (i.e., having about the same coordinates along the x and z axes of the coordinate axes of FIG. 2), this is merely illustrative. The watering stations 220a-220h may be located at any location throughout the assembly line grow pod 100 without departing from the scope of the present disclosure. In addition, while FIG. 2 depicts one of the watering stations 220a-220h at each floor 215 of the assembly line grow pod 100, this is also illustrative. That is, a particular floor 215 may contain a plurality of watering stations 220 or may not contain any watering stations 220. Regardless of location of the watering stations 220a-220h, the distance between the watering stations 220 (e.g., the length of track 102 extending between adjacent watering stations 220) is known. As such, a distance traversed by a cart 104 along the length of track 102 between watering stations 220 can be determined, as described in greater detail herein.

In embodiments, each of the watering stations 220a-220h are communicatively coupled to the master controller 160 via a network 250, as indicated by the dashed line between a fourth watering station 220d and the network 250 and the dashed line between the network 250 and the master controller 160. The network 250 may include the internet or other wide area network, a local network, such as a local area network, a near field network, such as Bluetooth or a near field communication (NFC) network. The network 250 is also coupled to a user computing device 260 and/or a remote computing device 270. The user computing device 260 may include a personal computer, laptop, mobile device, tablet, server, etc. and may be utilized as an interface with a user. As an example, a user may send a recipe to the user computing device 260 for implementation by the assembly line grow pod 100, which may further include implementation by the carts 104, the watering stations 220a-220h, and/or the like, as described in greater detail herein. Another example may include the assembly line grow pod 100 (including various components thereof) sending notifications to a user of the user computing device 260.

Communications between the various components depicted in FIG. 2 via the network 250 may be over a wired connection or a wireless connection. That is, the watering stations 220a-220h may communicate with the master controller 160 through a wired connection in some embodiments. In other embodiments, the watering stations 220a-220h may each include network interface hardware such that the watering stations 220a-220h wirelessly communicate with the master controller 160 through the network 250. In addition, operation of the various components within the watering stations 220a-220h may be controlled via the communicative coupling of the watering stations 220a-220h with the master controller 160 such that the master controller 160 can transmit signals to open or close valves, adjust an amount of water that is pumped, adjust one or more tension settings on biasing assemblies in relief valves, and/or the like. For example, the master controller 160 may transmit signals and/or data via the network 250 that contain an instruction to one or more of the watering stations 220a-220h for outputting a particular amount of water into a particular area of each one of the trays 106a-106h, as described in greater detail herein.

Figure 3:
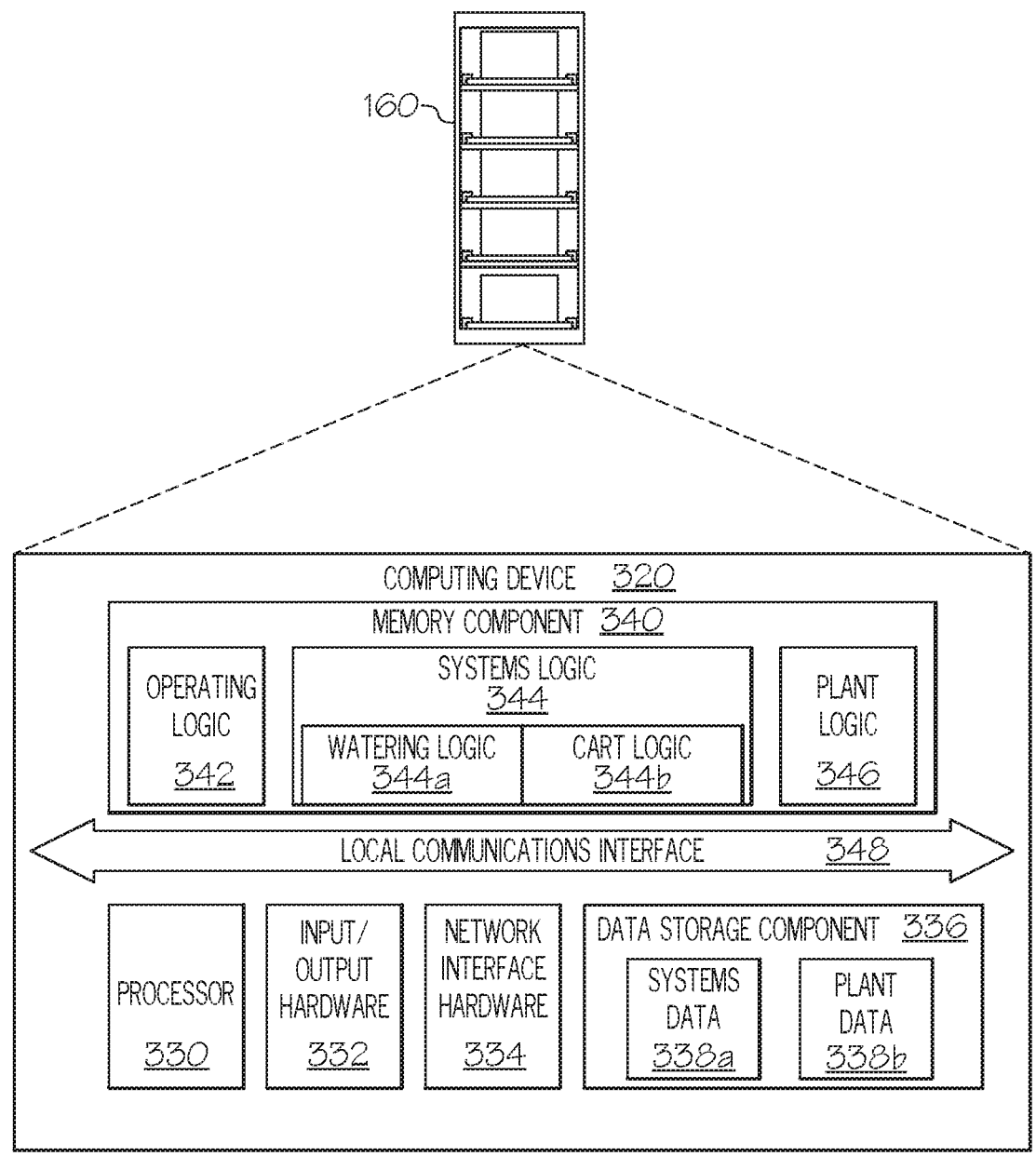
FIG. 3 depicts an illustrative computing environment within a master controller of an assembly line grow pod according to one or more embodiments shown and described herein.
Figure 4:
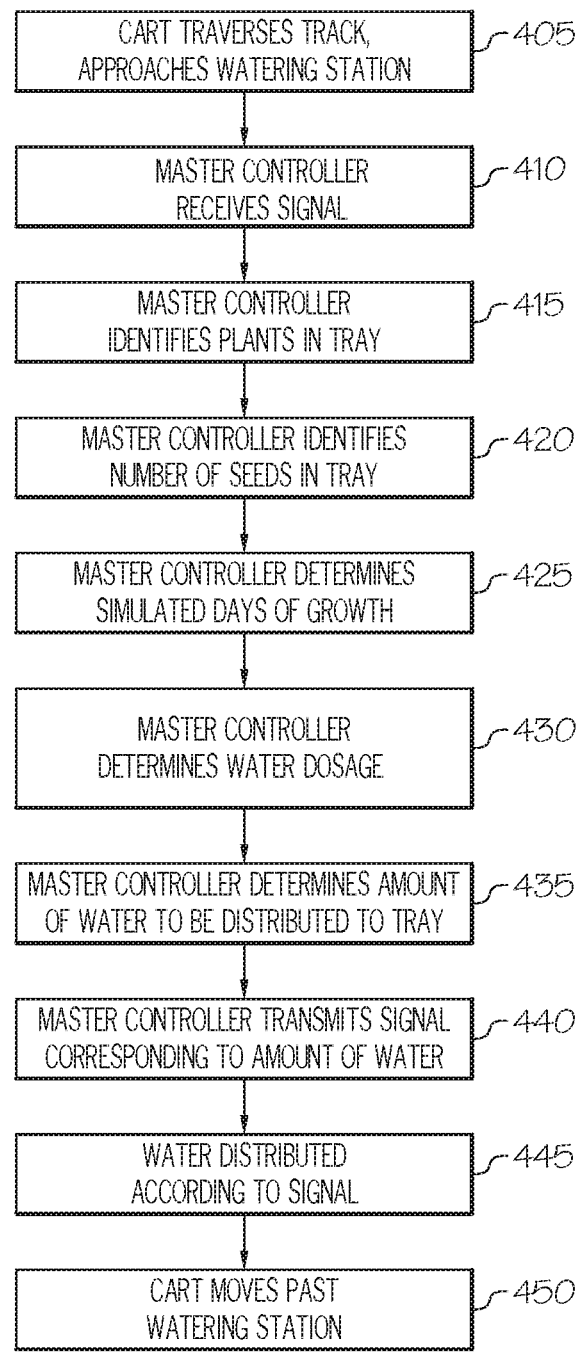
FIG. 4 depicts a flow diagram of an illustrative method of providing water to a cart at a particular location in an assembly line grow pod according to one or more embodiments shown and described herein.

Referring now to FIG. 3, an illustrative computing environment within the master controller 160 is depicted. It should be understood that the computing environment depicted in FIG. 4 is merely illustrative, and other computing environments within the master controller 160 and/or other components of the assembly line grow pod 100 (FIGS. 1A-1B) are contemplated. For example, the computing environment may be contained within a portion of the one or more of the watering stations 220a-220h (FIG. 2).

Still referring to FIG. 3, the master controller 160 may include a computing device 320. The computing device 320 includes a memory component 340, a processor 330, input/output hardware 332, network interface hardware 334, and a data storage component 336 (which stores systems data 338a, plant data 338b, and/or other data).

At least a portion of the components of the computing device 320 may be communicatively coupled to a local communications interface 348. The local communications interface 348 is generally not limited by the present disclosure and may be implemented as a bus or other communications interface to facilitate communication among the components of the computing device 320 coupled thereto.

The memory component 340 may be configured as volatile and/or nonvolatile memory. As such, the memory component 340 may include random access memory (including SRAM, DRAM, and/or other types of RAM), flash memory, secure digital (SD) memory, registers, compact discs (CD), digital versatile discs (DVD), Blu-Ray discs, and/or other types of non-transitory computer-readable mediums. Depending on the particular embodiment, these non-transitory computer-readable mediums may reside within the master controller 160 (or portion thereof) or external to the master controller 160 (or portion thereof). The memory component 340 may store, for example, operating logic 342, systems logic 344 (which may incorporate watering logic 344a and/or cart logic 344b), plant logic 346, and/or other logic. The operating logic 342, the systems logic 344, the watering logic 344a, the cart logic 344b, and the plant logic 346 may each include a plurality of different pieces of logic, at least a portion of which may be embodied as a computer program, firmware, and/or hardware, as an example. As such, the memory component 340 may be configured as a non-transitory, processor readable storage medium having programming instructions thereon (embodied within the operating logic 342, the systems logic 344, the watering logic 344a, the cart logic 344b, and the plant logic 346) that, when executed by the processor 330, cause the processor to execute a plurality of processes, such as the various processes described herein.

The operating logic 342 may include an operating system and/or other software for managing components of the assembly line grow pod 100 (FIGS. 1A-1B). As described in more detail below, the systems logic 344 may monitor and control operations of one or more particular components of the assembly line grow pod 100 (FIGS. 1A-1B), such as one or more valves, pumps, components within the watering station, carts, and/or the like. For example, the systems logic 344 may monitor and control operations of the components at the one or more watering stations 220a-220h (FIG. 2).

A portion of the systems logic 344 may be the watering logic 344a and/or the cart logic 344b, The watering logic 344a may be particularly configured to determine a precise amount of water to be supplied to a particular tray on a particular cart (and/or a particular cell within a tray), which watering station is tasked with providing the precise amount of water, and what time to supply the water, as described in further detail herein. The cart logic 344b may be particularly configured to determine an amount of fluid present in each tray (or cell within a tray) supported by a particular cart, the location of the cart relative to other components (e.g., relative to other carts, relative to a watering station, etc.), an amount of time before the cart reaches the next watering station, and/or the like, as described in greater detail herein. Both the watering logic 344a and the cart logic 344b may operate based on a particular recipe in some embodiments.

The plant logic 346 may be configured to determine and/or receive a recipe for plant growth and may facilitate implementation of the recipe via the systems logic 344, the watering logic 344a and/or the cart logic 344b. For example, a recipe for a plant determined by the plant logic 346 includes a predetermined water dosage, and the systems logic 344 (and/or the watering logic 344a) may instruct the various components at the watering stations 220a-220h (FIG. 2) to output water based on the water dosage.

It should be understood that while the various logic modules are depicted in FIG. 3 as being located within the memory component 340, this is merely an example. For example, the operating logic 342, the systems logic 344, the watering logic 344a, the cart logic 344b, and/or the plant logic 346 may reside on different computing devices. That is, one or more of the functionalities and/or components described herein may be provided by a user computing device, a remote computing device, and/or another control module that is communicatively coupled to the assembly line grow pod 100 (or component thereof).

Additionally, while the computing device 320 is illustrated with the operating logic 342, the systems logic 344, the watering logic 344a, the cart logic 344b, and the plant logic 346, this is also an example. In some embodiments, a single piece of logic (and/or or several linked modules) may cause the computing device 320 to provide the described functionality.

The processor 330 (which may also be referred to as a processing device) may include any processing component operable to receive and execute instructions (such as from the data storage component 336 and/or the memory component 340). Illustrative examples of the processor 330 include, but are not limited to, a computer processing unit (CPU), a many integrated core (MIC) processing device, an accelerated processing unit (APU), and a digital signal processor (DSP). In some embodiments, the processor 330 may be a plurality of components that function together to provide processing capabilities, such as integrated circuits (IC) (including field programmable gate arrays (FPGA), application-specific integrated circuits (ASIC)) and the like.

The input/output hardware 332 may include and/or be configured to interface with microphones, speakers, a display, and/or other hardware. That is, the input/output hardware 332 may interface with hardware that provides a user interface or the like. For example, a user interface may be provided to a user for the purposes of adjusting settings (e.g., an amount of nutrients/water to be supplied, etc.), viewing a status (e.g., receiving a notification of an error, a status of a particular valve or other component within the fluid delivery manifold, etc.), and/or the like.

The network interface hardware 334 may include and/or be configured for communicating with any wired or wireless networking hardware, including an antenna, a modem, LAN port, wireless fidelity (Wi-Fi) card, WiMax card, ZigBee card, Z-Wave card, Bluetooth chip, USB card, mobile communications hardware, and/or other hardware for communicating with other networks and/or devices. From this connection, communication may be facilitated between the various components of the assembly line grow pod 100 (FIGS. 1A-1B), such as, for example, communication between control modules, the seeder component, the harvesting component, the watering component, the one or more pumps, one or more valves, the various watering stations (and components thereof), the various carts, and/or the like. In some embodiments, the network interface hardware 334 may also facilitate communication between the assembly line grow pod 100 and components external to the assembly line grow pod 100, such as, for example, user computing devices and/or remote computing devices.

Still referring to FIG. 3, the master controller 160 may be coupled to a network (e.g., the network 250 described with respect to FIG. 2) via the network interface hardware 334. Various other control modules, other computing devices, and/or the like may also be coupled to the network, as described in greater detail herein. Illustrative other computing devices include, for example, a user computing device and a remote computing device. The user computing device may include a personal computer, laptop, mobile device, tablet, server, etc. and may be utilized as an interface with a user. As an example, a user may send a recipe to the computing device 320 for at least a partial implementation by the various components of the assembly line grow pod 100 (FIGS. 1A-1B) via the master controller 160. Another example may include the master controller 160 (and/or one or more components thereof) sending notifications to a user of the user computing device.

Similarly, the remote computing device may include a server, personal computer, tablet, mobile device, etc. and may be utilized for machine to machine communications. As an example, if the master controller 160 determines a type of seed being used (and/or other information, such as an amount of water to be supplied at particular times), the computing device 320 may communicate with the remote computing device to retrieve a previously stored recipe for those conditions. As such, some embodiments may utilize an application program interface (API) to facilitate this or other computer-to-computer communications.

Still referring to FIG. 3, the data storage component 336 may generally be any medium that stores digital data, such as, for example, a hard disk drive, a solid state drive (SSD), Optane® memory (Intel Corporation, Santa Clara Calif.), a compact disc (CD), a digital versatile disc (DVD), a Blu-Ray disc, and/or the like. It should be understood that the data storage component 336 may reside local to and/or remote from the master controller 160 and may be configured to store one or more pieces of data and selectively provide access to the one or more pieces of data. As illustrated in FIG. 3, the data storage component 336 may store systems data 338a, plant data 338b, and/or other data. The systems data 338a may generally include data relating to the functionality of the assembly line grow pod 100 (FIGS. 1A-1B) and/or one or more components thereof (e.g., the various watering stations), such as stored settings, information regarding the location of components within the assembly line grow pod 100, functionality of various components within the assembly line grow pod 100, and/or the like. The plant data 338b may generally relate to recipes for plant growth, settings of various components within the assembly line grow pod 100 (FIGS. 1A-1B), data relating to control of the assembly line grow pod 100 (and/or a component thereof), sensor data relating to a particular tray or cart, and/or the like.

It should be understood that while the components in FIG. 3 are illustrated as residing within the master controller 160, this is merely an example. In some embodiments, one or more of the components may reside external to the master controller 160, such as within a user computer, a control server, another component of the assembly line grow pod 100 (FIGS. 1A-1B) and/or the like. It should also be understood that, while the computing device 320 is illustrated as a single device, this is also merely an example. That is, the computing device 320 may be a plurality of devices that are communicatively coupled to one another and provide the functionality described herein.

Referring collectively to FIGS. 2 and 3, the various components of the master controller 160 may be used such that the master controller 160 stores water dosages for various plants, and instructs the watering stations 220a-220h (or components thereof) to output water based on the water dosages. Specifically, the watering stations 220a-220h (or components thereof, such as water distribution manifolds, peristaltic pumps, or the like) output water based on the water dosages for the plants in the trays 106a-106h supported by the carts 104a-104h passing through (or adjacent to) the watering stations 220a-220h. The water dosage may include, for example, an amount of water per seed, an amount of water per tray 106, an amount of water per cell in a tray 106, a watering period, a number of simulated days of growth associated with the plants, a determined growth metric, and/or the like. For example, a water dosage for illustrative Plant A and a water dosage for illustrative Plant B are shown in tables 1 and 2 below. While the total simulated days of growth are set to 6 days, it should be understood that more or less than 6 days of watering may be necessary.

TABLE 1

Water Dosage for Plant A

| | Amount of Water (per seed) | Watering Period |
|---|---|---|
| Day 1 | 0.3 mL/seed | Once a day |
| Day 2 | 0.5 mL/seed | Once a day |
| Day 3 | 1 mL/seed | Every 12 hours |
| Day 4 | 1.2 mL/seed | Every 12 hours |
| Day 5 | 2 mL/seed | Every 6 hours |
| Day 6 | 2 mL/seed | Every 6 hours |

TABLE 2

Water Dosage for Plant B

| | Amount of Water (per seed) | Watering Period |
|---|---|---|
| Day 1 | 1 mL/seed | Once a day |
| Day 2 | 1.2 mL/seed | Every 12 hours |
| Day 3 | 2 mL/seed | Every 12 hours |
| Day 4 | 3 mL/seed | Every 6 hours |

TABLE 2-continued

Water Dosage for Plant B

| | Amount of Water (per seed) | Watering Period |
|---|---|---|
| Day 5 | 5 mL/seed | Every 6 hours |
| Day 6 | 5 mL/seed | Every 6 hours |

Still referring collectively to FIGS. 2 and 3, the various components of the master controller 160 may be used to identify the plants in trays 106a-106d of the carts 104a-104d as plant A in some embodiments. For example, the master controller 160 may communicate with the carts 104a-104d to receive information about the plants in the respective trays 106a-106d supported thereon. As another example, the information about the plants in the trays 106a, 106b, 106c, and 106d may be pre-stored in the data storage component 336 of the master controller 160 (e.g., as part of the plant data 338b) when the seeder component 108 (FIGS. 1A-1B) places seeds for plant A in the trays 106a, 106b, 106c, and 106d.

In a similar fashion, the master controller 160 may identify the plants in trays 106e-106h of the carts 104e-104h as plant B in some embodiments. For example, the master controller 160 may communicate with the carts 104e-104h to receive information about the plants in the respective trays 106e-106h supported thereon. As another example, the information about the plants in the trays 106e, 106f, 106g, and 106h may be pre-stored in the data storage component 336 of the master controller 160 (e.g., as part of the plant data 338b) when the seeder component 108 (FIGS. 1A-1B) places seeds for plant B in the trays 106e, 106f, 106g, and 106h.

In embodiments, the master controller 160 may identify the number of seeds in each of the trays 106a-106h supported by the carts 104a-104h (or in each cell of each of the trays 106a-106b). In some embodiments, the number of seeds in each of the trays 106a-106h (or cells within each of the trays 106a-106h) may be pre-stored in the data storage component 336 of the master controller 160 (e.g., as part of the plant data 338b) when the seeder component 108 (FIGS. 1A-1B) provides seeds for plant A to the trays 106a-106d supported by the carts 104a-104d. Similarly, the number of seeds in each of the trays 106e-106h (or in each cell of each of the trays 106e-106h) may be pre-stored in the data storage component 336 of the master controller 160 (e.g., as part of the plant data 338b) when the seeder component 108 (FIGS. 1A-1B) provides seeds for plant B to the trays 106e-106h supported by the carts 104e-104h. In some embodiments, the master controller 160 may determine the number of seeds in the one or more trays 106a-106h (or cells therein) based on the change in weight of the carts 104a-104h and/or the trays 106a-106h. For example, if the weight of cart 104a is changed by 100 grams after seeds have been placed in the tray 106a supported thereon, and the known weight of one seed is 0.2 grams, then the master controller 160 determines that 500 seeds are present in the tray 106a.

In embodiments, the master controller 160 may determine a number of actual days or simulated days of growth with respect to the plant material carried by the trays 106a-106h supported on the carts 104a-104h. In some embodiments, the master controller 160 may determine the number of actual or simulated days of growth for plants carried by the trays 106a-106h based on a particular position of the carts 104a-104h on the track 102 relative to a previous position of the carts 104a-104h on the track 102. For example, the master controller 160 determines a current position of a particular one of the carts 104a-104h on the track 102 that starts with a seeding point and ends at a harvesting point. That is, if a particular one of the carts 104a-104h moves less than ⅙ of the total distance of the track 102, the master controller 160 may determine that the plant in the respective tray 106a-106h is in day 1 of growth given that a total day of growth is 6 days. As another example, if a particular one of the carts 104a-104h moves more than ½ of the total distance but less than ⅔ of the total distance of the track 102, the master controller 160 may determine that the plant in the respective tray 106a-106h is in day 4 of growth.

In some embodiments, the watering stations 220a-220h (or components thereof, such as water distribution manifolds, peristaltic pumps, or the like) may be preset for providing water to trays 106a-106h on particular days of growth based on relative positions of the watering stations 220a-220h with a length of the track 102. For example, watering stations 220a, 220b, and 220c may be preset to provide water in a first simulated day of plant growth, watering stations 220d, 220e, and 220f may be preset to provide water in a second simulated day of growth, and watering stations 220g and 220h may be preset to provide water in a third simulated day of growth. As such, one or more of the carts 104a-104h may move such that the corresponding trays 106a-106h are positioned under watering stations 220a-220c during a first simulated day, under watering stations 220d-220f during a second simulated day, and under watering stations 220g-220h for a third simulated day.

Once the plant material in each of the trays 106a-106h has been identified, a particular simulated day of growth has been determined, and the number of seeds (or other plant material) has been determined, the master controller 160 may transmit instructions (in the form of data and/or signals) to the watering stations 220a-220h to provide water to each of the trays 106a-106h (or cells within each of the trays 106a-106h) according to the predetermined water dosages for a particular plant (e.g., Plant A and Plant B). One such example of steps completed by the various components is described hereinbelow in Example A. It should be understood that Example A is merely illustrative, and other recipes that include different set amounts, timings, and/or the like are included within the scope of the present disclosure. In some embodiments, the recipes may be fluid (e.g., subject to change) so as to adjust water supply to plants based on a growth of the plant and/or other factors that may be detected by the master controller 160. One such example of a change in a recipe is described hereinbelow in Example B. It should be understood that Example B is merely illustrative, and other changes to recipes may be implemented without departing from the scope of the present disclosure.

FIG. 4 depicts a flow diagram of an illustrative method of providing water to a cart at a particular location in an assembly line grow pod, according to embodiments described herein. The various processes described with respect to FIG. 4 may generally be completed by the components described herein with respect to FIGS. 1A-1B, 2, and 3. Certain processes may be implemented by the master controller 160 and carried out by other components, such as the watering stations, the carts, the trays, and/or the like. While the processes described in FIG. 4 may refer to a single cart, it should be understood that the processes may be carried out for each of the carts in the assembly line grow pod.

As illustrated at block 405, a cart carrying a tray holding plant material traverses the track of the assembly line grow pod until it approaches a watering station. For example, the cart may be self-powered and may traverse the track at a particular speed such that it reaches a portion of the track that is adjacent to a watering station.

At block 410, the master controller may receive a signal that corresponds to the presence of the cart, the identity of the cart, the type of plant material in the tray, the amount of seeds in the tray, the simulated day of growth that the plant material is currently in, the location of the watering station that the cart is approaching, various settings of the cart and/or the watering station, and/or the like. Other signals may be (or may have already been) received by the master controller that indicate the type of seeds placed in the tray (e.g., signals from the seeder). The signal may be received by the master controller from the cart, the tray, sensors coupled to the track, sensors adjacent to the track, sensors coupled to the watering station, sensors adjacent or within the watering station, sensors coupled to other components of the assembly ling grow pod, other assembly line grow pod components, and/or the like.

At block 415, the master controller may identify the plant material in the tray. That is, the master controller determines the type of plant material that is held in the tray. As previously described herein, the plant matter may be determined based on information that has been received (e.g., via signals and/or data transmitted to the master controller) or by accessing pre-stored information. For example, the signals may come from the seeder at the time seeds are placed, which indicates the type and number of seeds. The signals may also come from various other components and/or sensors of the assembly line grow pod, such as the components and/or sensors described herein. In some embodiments, the information that is received by the master controller may directly reference a type and number of seeds (or other plant material) deposited in a particular tray, such as information received from a seeder regarding the type and number of seeds that were deposited. In other embodiments, the information that is received may be used to infer the type and number of seeds (or other plant material) that is present in a particular tray. For example, if the master controller is provided with information that the seeder is configured to deposit a specific number of seeds (e.g., 500 seeds) in each tray and additional information received by the master controller is indicative of a weight of 100 grams, the master controller may determine that the average seed weight is 0.2 grams per seed, which may correspond to a particular seed type. Other means of identifying the plant material in the tray may be used, such as the methods described herein.

In addition to identifying the plant material, the master controller may further determine the number of seeds in the tray at block 420. As previously described herein, such information may be pre-stored or may be received from one or more components of the assembly line grow pod (e.g., via signals and/or data transmitted to the master controller). For example, the master controller may receive a signal from a weight sensor coupled to the tray, the cart, the track, and/or the like, where the signal corresponds to a sensed weight. The weight of the plant material can then be determined from the sensed weight. That is, the weight of the plant material may be determined by subtracting a known or previously determined weight of other components (e.g., the tray, the cart, water/nutrients in the tray, etc.) from a measured weight to obtain a weight of the plant matter. In some embodiments, the number of seeds in the tray may be determined from a signal received from the seeder component, the signal indicating the number of seeds the seeder component deposited into the tray.

In addition to identifying the plant material and determining the number of seeds, the master controller may also determine the number of simulated days of growth at block 425. As previously described herein, the number of simulated days of growth may be determined based on a position of the cart along a length of the track, a distance from a particular component (such as a watering station, the seeder component, a harvesting station, and/or the like), a speed at which the cart is moving along the track, and/or the like.

Armed with the information regarding the type of plant material, the number of seeds or other plant material, and the number of simulated days of growth, the master controller may determine a water dosage at block 430 and an amount of water to be distributed to the tray at block 435. As previously described herein, the dosage may be determined based on a recipe, a predetermined amount (such as the amounts discussed in Tables 1 and 2 above), a modified recipe based on previous water usage, an amount currently present in the tray, an amount that should be present in the tray, an amount based on a measured growth metric, and/or the like.

At block 440, a signal may be transmitted by the master controller. The signal may generally be transmitted to one or more of the watering stations (or component thereof) that directs the watering station(s) (or component(s) thereof) to provide a precise amount of water to the tray passing therethrough. The signal is generally such that the watering station(s) (or component(s) thereof) are directed to provide the amount of water determined at block 435 above. Accordingly, the precise amount of water is distributed to the tray at block 445 at the time at which the corresponding tray is located within a distribution area of the watering station (e.g., adjacent to the watering station). Once the appropriate amount of water is supplied, the cart may move past the watering station at block 450 to continue to the next station (e.g., subsequent watering station, harvesting component, etc.).

Example A

In the present example, an assembly line grow pod 100 as described in FIGS. 1A-1B, 2, and 3 is provided. The master controller 160 and the other components of the assembly line grow pod 100 operate as follows.

The master controller 160 determines that tray 106a supported on cart 104a carries Plant A, Plant A is in a first simulated day of growth, and the tray 106a is holding 500 seeds for Plant A. Accordingly, the master controller 160 transmits instructions (e.g., via signals and/or data) to watering station 220a to provide 150 mL of water based on the water dosage for plant A as shown in Table 1 above.

Similarly, the master controller 160 deter nines that trays 106b and 106c supported by carts 104b and 104c carry Plants A, that Plants A are in a first simulated day of growth, and that trays 106b and 106c each carry 500 seeds for Plant A, respectively. The master controller 160 accordingly instructs (e.g., via signals and/or data) watering stations 220b and 220c not to supply water to trays 106b and 106c based on the water dosage for Plant A because the water dosage for Plant A in the first simulated day of growth describes watering "once a day" according to Table 1 above, and Plants A in trays 106b and 106c had been previously watered in the first simulated day of growth when passing under watering station 220a. For tray 106d supported on cart 104d, the master controller 160 may determine that tray 106d carries Plants A, that Plants A are in a second simulated day of growth, and the tray 106d carries 500 seeds for Plant A. Accordingly, the master controller 160 instructs (e.g., via signals and/or data) watering station 220d to provide 250 mL of water based on the determined water dosage for Plant A as shown in Table 1 above.

In addition, the master controller 160 determines that trays 106e and 106f supported by carts 104e and 104f carry Plants B, that Plants B are in a second simulated day of growth, and each of trays 106e and 160f carry 400 seeds for Plant B, respectively. Then, the master controller 160 instructs watering stations 220e and 220f to provide 480 mL of water based on the water dosage for Plant B as indicated in Table 2 above. If the plant material in trays 106e or 106f has been watered within the previous 12 hours, then the master controller 160 instructs watering stations 220e or 220f not to provide water into the corresponding trays 106e, 106f according to the water dosage.

Additionally, the master controller 160 determines that trays 106g and 106h supported by carts 104g and 104h carry Plants B, that Plants B are in a third simulated day of growth, and trays 106g and 106h carry 400 seeds for Plant B, respectively. Then, the master controller 160 instructs watering stations 220g and 220h to provide 800 mL of water based on the water dosage for Plant B as indicated in Table 2 above. If the plant material in trays 106g or 106h has been watered within the previous 6 hours, then the master controller 160 instructs watering stations 220g or 220h not to provide water into the corresponding trays 106g, 106h according to the water dosage.

Example B

As mentioned, the water dosage for the plant material contained within the trays may be updated based on the amount of water retained in carts, and a recipe may need to be adjusted accordingly. In the present example, if the water in carts carrying Plant A in a first simulated day of growth is completely gone (e.g., no water is sensed in the tray, either because it has been completely used by the plant matter, has evaporated, was inadvertently not applied due to misalignment, damage, error, or the like), the amount of water supplied in the first simulated day of growth may be increased by a particular amount, and/or the time that elapses between subsequent watering sessions may be shortened. If an average amount of water present in the trays carrying Plant A in a second simulated day of growth is greater than a predetermined amount (e.g., an amount expected based on the type of plant, the amount of plant material/seeds, the amount of water previously supplied, the type of growing conditions such as air element concentrations, temperature, humidity, and/or the like), the amount of water that is suppled in the second simulated day may be decreased by a particular amount, and/or the time that elapses between subsequent watering sessions may be lengthened. Similarly, if it is determined that a portion of the plant matter did not consume an expected amount of water, the watering may be reduced and/or the water in a cell of a tray may be flushed and replaced with new water, as desired.

As illustrated above, various embodiments for determining a location of a cart, the type of plant material within a tray of the cart, whether an amount of water is to be distributed, and distributing a precise amount of water to the tray in an assembly line grow pod are disclosed. As a result of the embodiments described herein, particular control of water supplied to the plant material can be achieved throughout the lifespan of the plant material that is grown, regardless of the rate at which the plant material consumes the water and/or the location of the cart in the assembly line grow pod. In addition, a determination of a future watering of a cart can be made and planned for accordingly as a result of the embodiments described herein.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for managing water dosages in an assembly line grow pod to ensure an appropriate amount of fluid is supplied to plant matter as a cart containing the plant matter traverses the track of the assembly line grow pod. It should also be understood that these embodiments are merely exemplary and are not intended to limit the scope of this disclosure.

What is claimed is:

1. An assembly line grow pod comprising:
   a track extending a length between a seeder component and a harvester component;
   a plurality of watering stations arranged adjacent to the track at a plurality of locations along the length of the track between the seeder component and the harvester component;
   a cart supported on the track and movable along the track from the seeder component to the harvester component such that seeds that are placed by the seeder component within the cart grow into plant material that is harvested at the harvester component; and
   a controller that determines an amount of water provided by each watering station to the cart based on a location of the cart and according to a predetermined growth metric determined from one or more characteristics of the plant material.

2. The assembly line grow pod of claim 1, further comprising:
   a watering component; and
   one or more water lines fluidly coupled to the watering component and each one of the plurality of watering stations, the one or more water lines fluidly coupled between the watering component and each one of the plurality of watering stations.

3. The assembly line grow pod of claim 2, further comprising one or more pumps fluidly coupled to the one or more water lines between the watering component and each one of the plurality of watering stations.

4. The assembly line grow pod of claim 2, further comprising one or more flow control valves fluidly coupled to the one or more water lines between the watering component and each one of the plurality of watering stations.

5. The assembly line grow pod of claim 1, wherein:
   the track is arranged such that an ascending portion of the track spirals in a vertical direction to create a perceived plurality of floors; and
   each one of the plurality of watering stations is arranged on a corresponding one of the perceived plurality of floors.

6. The assembly line grow pod of claim 1, wherein the one or more characteristics of the plant material are selected from: an amount of stem growth in a time period, an amount of leaf growth in a time period, a number of fruits produced in a time period, a number of seeds produced in a time period, and an amount of mass increase in a time period.

7. The assembly line grow pod of claim 1, wherein at least one of the plurality of watering stations comprises one or more watering manifolds that deliver a predetermined amount of water to the cart or a section of the cart.

8. The assembly line grow pod of claim 1, wherein at least one of the plurality of watering stations comprises one or more peristaltic pumps that deliver a predetermined amount of water to the cart or a section thereof.

9. The assembly line grow pod of claim 1, wherein each one of the plurality of watering stations comprises one or more water outlets that are positioned above the track such that, when the cart moves adjacent to each one of the plurality of watering stations, each one of the one or more water outlets is aligned with a particular area of a tray supported by the cart.

10. An assembly line grow pod comprising:
    a track extending a length;
    a plurality of watering stations positioned adjacent to the track at a plurality of locations along the length of the track;
    a cart supported on the track, the cart holding plant material therein; and
    a master controller comprising a processor and a non-transitory storage medium having one or more programming instructions stored thereon that, when executed, cause the processor to:
    determine a location of the cart relative to one or more of the plurality of watering stations,
    determine one or more characteristics of the plant material held within the cart,
    determine an amount of water to be supplied to the cart based on the location of the cart and the one or more characteristics of the plant material,
    determine one or more of the plurality of watering stations to supply the water to the cart, and
    transmit a signal to the one or more of the plurality of watering stations, wherein the signal causes the one or more of the plurality of watering stations to supply the amount of water to the cart when the cart is adjacent to each of the one or more of the plurality of watering stations.

11. The assembly line grow pod of claim 10, wherein the one or more programming instructions that, when executed, cause the processor to determine the one or more characteristics of the plant material further cause the processor to identify the plant material in a tray supported by the cart.

12. The assembly line grow pod of claim 10, wherein the one or more programming instructions that, when executed, cause the processor to determine the one or more characteristics of the plant material further cause the processor to identify a number of seeds in a tray supported by the cart.

13. The assembly line grow pod of claim 10, wherein the one or more programming instructions that, when executed, cause the processor to determine the one or more characteristics of the plant material further cause the processor to determine an amount of growth undergone by the plant material according to a growth metric.

14. The assembly line grow pod of claim 10, wherein the one or more programming instructions, when executed, further cause the processor to determine a water dosage that is based on a recipe, a predetermined amount of water to be supplied, a modified recipe based on previous water usage, an amount of water present in the cart, or an amount of water that should be present in the cart.

15. A method of supplying a predetermined amount of water to plant material within a tray on a cart supported on a track in an assembly line grow pod, the method comprising:
- determining, by a processor, a location of the cart relative to one or more of a plurality of watering stations adjacent to the track within the assembly line grow pod;
- determining, by the processor, one or more characteristics of the plant material within the tray;
- determining, by the processor, an amount of water to be supplied to the tray based on the location of the cart and the one or more characteristics of the plant material;
- determining, by the processor, one or more of the plurality of watering stations to supply the water to the tray; and
- transmitting, by the processor, a signal to the one or more of the plurality of watering stations, wherein the signal causes the one or more of the plurality of watering stations to supply the amount of water to the tray when the cart is adjacent to each of the one or more of the plurality of watering stations.

16. The method of claim 15, wherein determining the one or more characteristics of the plant material comprises identifying the plant material in the tray.

17. The method of claim 15, wherein determining the one or more characteristics of the plant material further comprises identifying a number of seeds in the tray.

18. The method of claim 15, wherein determining the one or more characteristics of the plant material comprises determining an amount of growth undergone by the plant material according to a growth metric.

19. The method of claim 15, further comprising:
- determining, by the processor, a water dosage that is based on a recipe, a predetermined amount of water to be supplied, a modified recipe based on previous water usage, an amount of water present in the cart, or an amount of water that should be present in the cart.

20. The method of claim 15, further comprising:
- moving the cart along the track such that the tray is adjacent to one of the plurality of watering stations to receive the amount of water.

* * * * *